June 1, 1943. W. L. KEEFER 2,320,364
ABRADING APPARATUS
Filed March 19, 1940 5 Sheets-Sheet 2
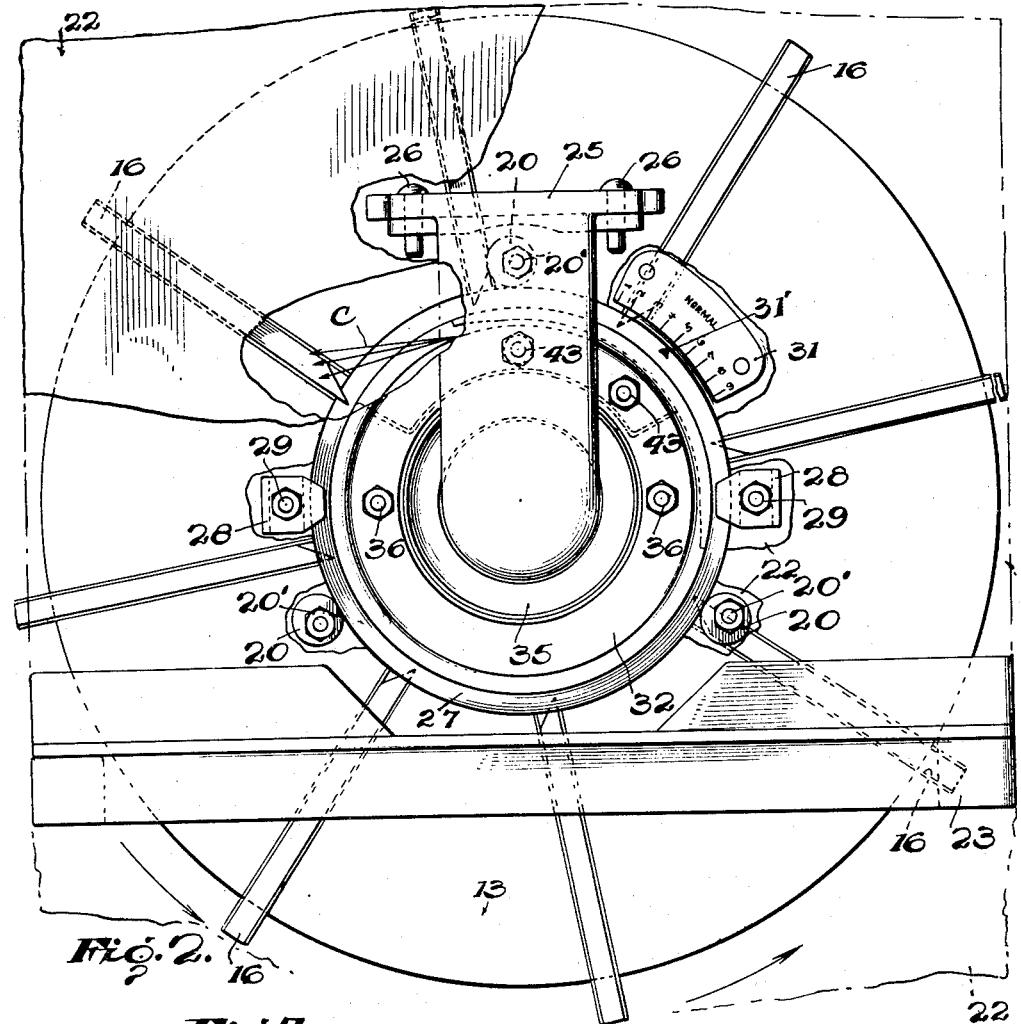
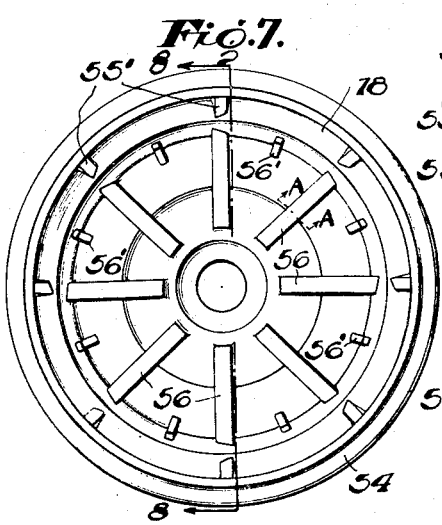
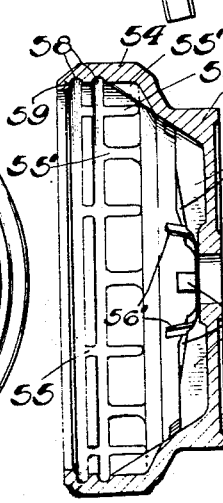
Inventor
Walter L. Keefer
By
Spear, Donaldson & Hall
Attorneys June 1, 1943. W. L. KEEFER 2,320,364
ABRADING APPARATUS
Filed March 19, 1940 5 Sheets-Sheet 3
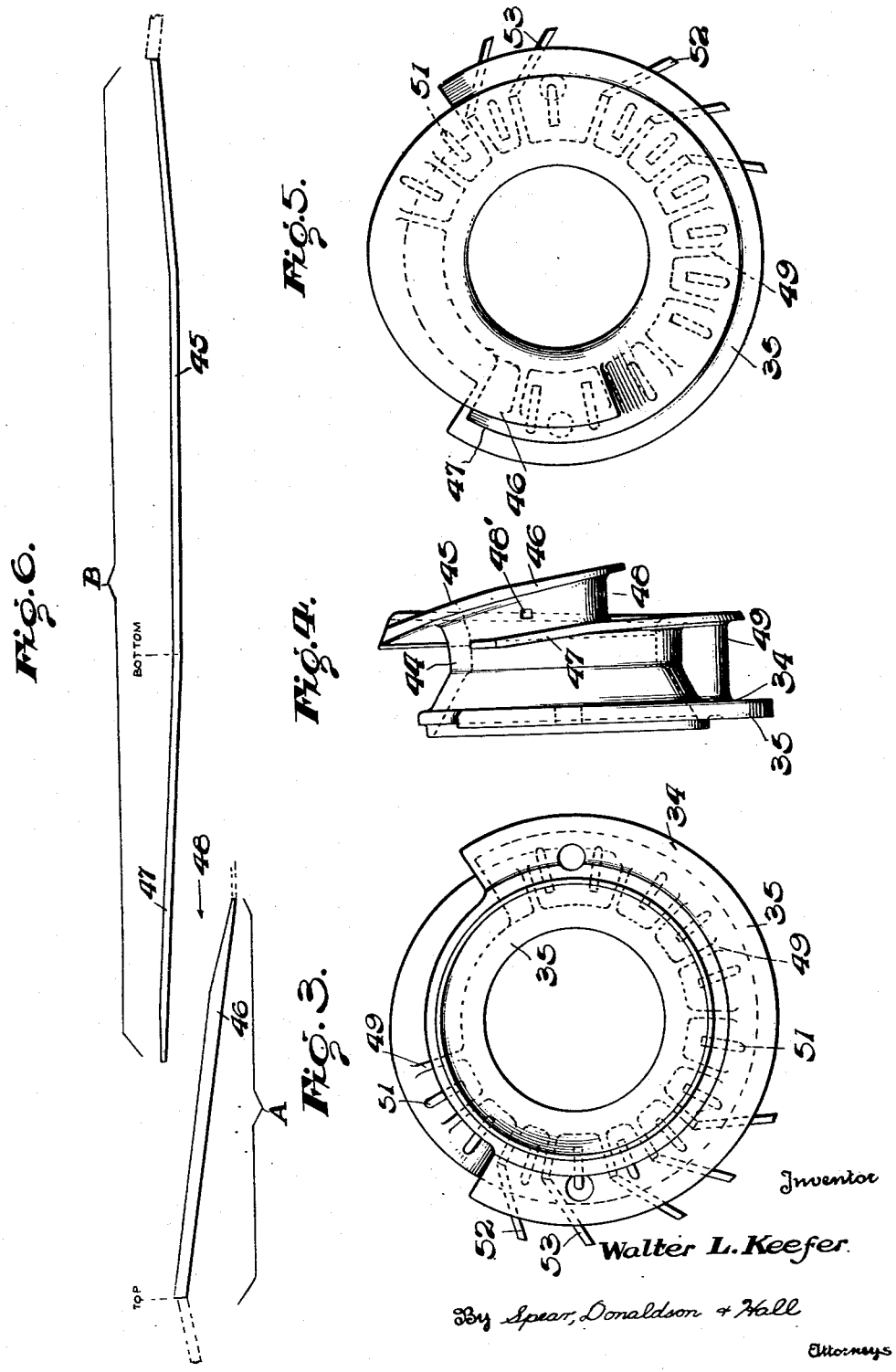

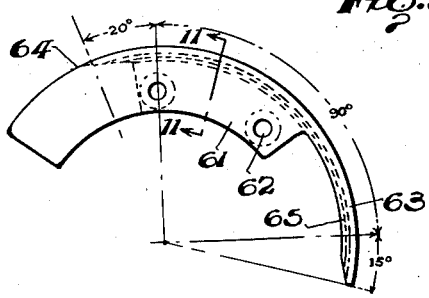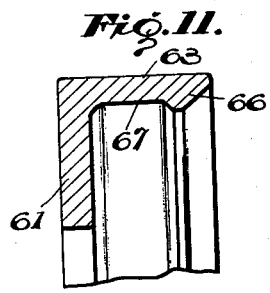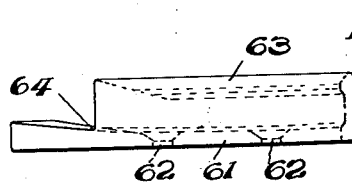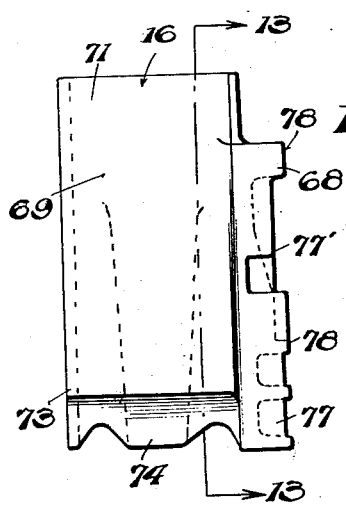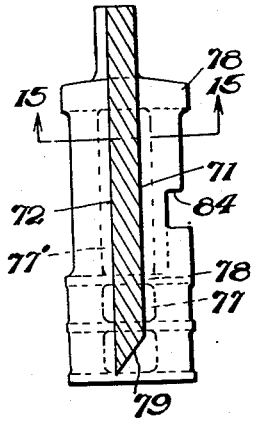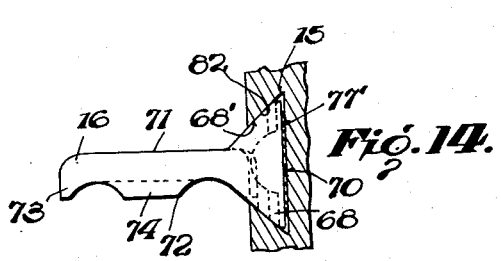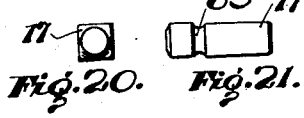

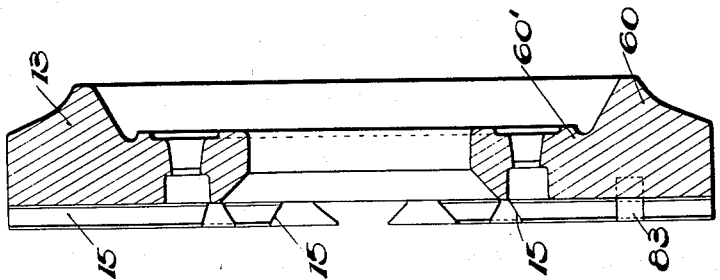
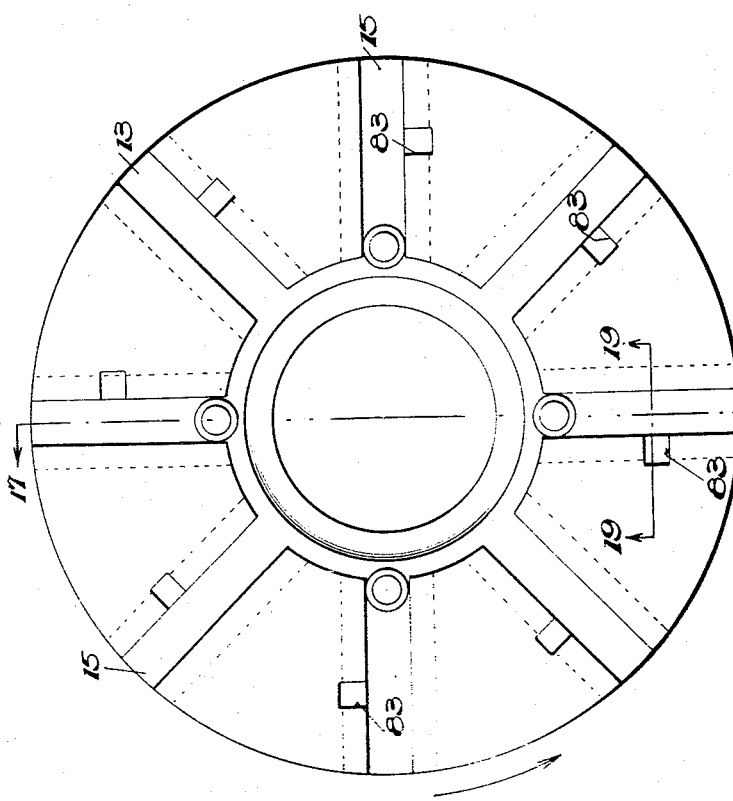
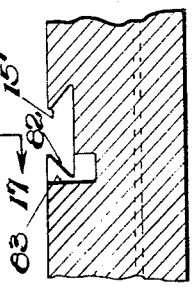

Patented June 1, 1943

2,320,364

UNITED STATES PATENT OFFICE 2,320,364

ABRADING APPARATUS

Walter L. Keefer, Hagerstown, Md., assignor to Pangborn Corporation, Hagerstown, Md., a corporation of Maryland Application March 19, 1940, Serial No. 324,860

18 Claims. (Cl. 51—9)

This invention relates to improvements in centrifugal abrading apparatus embodying one or more blades or vanes extending outwardly from the region of an axis about which they revolve, and means for feeding abrasive to the inner ends of such blades. The invention is more particularly directed to improvements over the apparatus disclosed in my pending application Serial No. 195,138, filed March 10, 1938, now Patent No. 2,246,522.

In improving the apparatus disclosed in the above-identified application, it is an object of my invention to provide an abrading apparatus embodying a novel type of blade, the efficiency and life thereof as compared to prior blades being increased.

Still a further object of my invention is the provision of a novel deflector embodying reinforcing means and heat dissipating means of more efficient character, means to return abrasive deflected by the inner ends of the blades to the propelling surfaces of the blades, and means to prevent "peeling" of the deflector as well as to indicate when its life has ended.

Still a further object is to provide novel locating means for the deflector whereby the deflector can be readily centered with respect to the assembly, and its maintenance in that position assured.

Further objects of the invention will become apparent upon reading the specification in connection with the annexed drawings, wherein Figure 1 is a longitudinal section of a preferred embodiment of the present invention.

Figure 2 is a view of the embodiment of Figure 1 as viewed from the left of that figure, a portion of the housing being removed and a portion being shown in outline to show the interior of the unit.

Figure 3 is an elevation of the so-called deflector of the present invention, the deflector being viewed from the left in Figure 1.

Figure 4 is a side elevation of the deflector assembly of Figure 3.

Figure 5 is an elevation of the deflector as viewd from the right in Figure 1.

Figure 6 is a development of the blade of the deflector of Figures 3 to 5, inclusive.

Figure 7 is an elevation of the abrasive receiving cup of the apparatus shown in Figure 1 when viewed from the left of that figure.

Figure 7A is a section taken on the line A—A of Figure 7.

Figure 8 is a section on the line 8—8 of the cup of Figure 7.

Figure 9 is a side elevation of the guard of the present invention.

Figure 10 is a plan of the guard of Figure 9.

Figure 11 is a section of the guard of Figure 9 taken on the line 11—11 of Figure 9.

Figure 12 is a side elevation of one of the abrasive propelling blades or vanes of Figure 1.

Figure 13 is a section taken on the line 13—13 of Figure 12.

Figure 14 is an end elevation of the blade of Figure 12, this figure additionally showing a portion of the disc rotor including the solt in which the base of the blade is positioned.

Figure 15 is a section taken on the line 15—15 of Figure 13.

Figure 16 is a front elevation of the rotor disc or runner of Figure 1.

Figure 17 is a section taken on the line 17—17 of Figure 16.

Figure 18 is a plan of a portion of the rotor of Figure 16 illustrating one of the dovetail slots that are cast therein to receive an abrasive propelling blade.

Figure 19 is a section taken on the line 19—19 of Figure 16.

Figure 20 is an end elevation of one of the pins employed to secure the abrasive propelling blades to the rotor disc.

Figure 21 is a side elevation of the pin of Figure 20.

Figure 1:
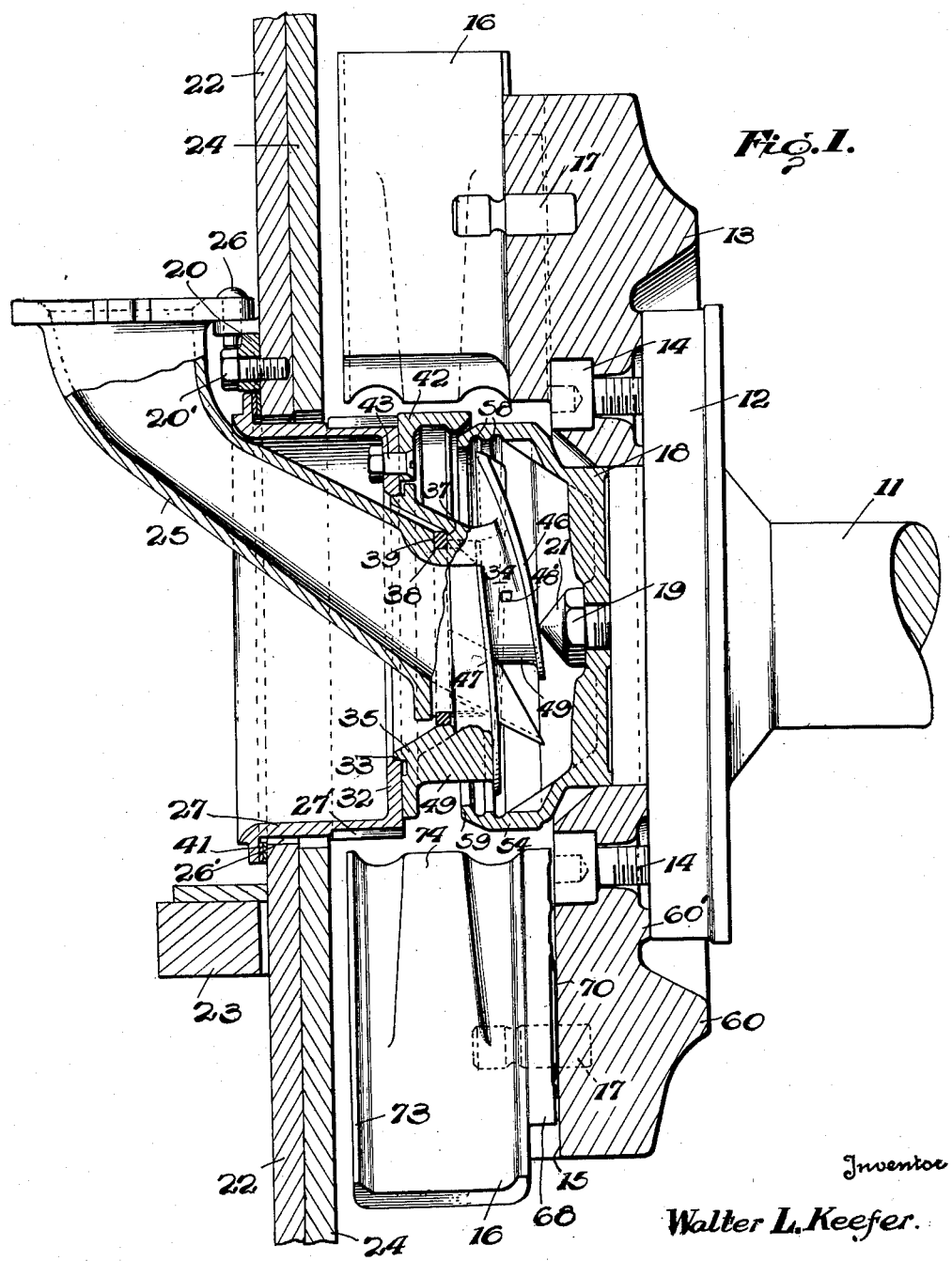

Referring to Figures 1 and 2, the preferred embodiment of the invention shown herein for the purpose of disclosure comprises a shaft 11 arranged to be driven by suitable means, not shown. Shaft 11 is provided with a hub portion 12, preferably pressed on and keyed thereto, to which is secured a rotor disc or runner 13, preferably by hollow head screws as shown at 14. Disc 13 is preferably cast in one piece and in a manner to form a series of slots 15 extending outwardly from the region of the axis of the disc 13 (shown in detail in Figure 18) into which slots 15 blades 16 are fitted. Blades 16 are locked to disc 13 by pins 17 in a manner to be described in detail. An abrasive receiving cup 18 is secured to hub 12 by a special screw 19 having a conical head 21 for a purpose to be later described. With this arrangement, hub 12, disc 13, blades 16, and abrasive receiving cup 18 rotate as a unit with shaft 11, these elements constituting the only moving parts of the device in normal operation.

The assembly is preferably mounted in a housing, a portion of a side wall of which is shown at 22, supported upon a suitable base 23. To prevent undue wear on the interior walls of the housing, readily replaceable wear plates 24 are provided on the interior of the housing. A feed spout 25 for abrasive is secured to the outer wall of the housing as by loose rivets 26. Spout 25 is shaped and positioned to extend into the interior of abrasive receiving cup 18 to discharge abrasive into the interior of the cup 18, the abrasive being distributed or dispersed therein by conical member 21.

Wall 22 is formed with an aperture 26' into which is fitted a deflector holder 27. Holder 27 is secured in position by lugs 28 (Fig. 2) secured in turn to wall 22 by stud and nut assemblies 29. With this arrangement, deflector holder 27 may be rotated relative to wall 22 and locked in any desired position. For convenience in determining the position of holder 27, a scale 31 with suitable indicia thereon is preferably provided on wall 22 in combination with a notch or index 31' on holder 27. Three eccentrics or cams 20 with suitable securing means 20' are provided on wall 22 to enable the correct positioning of holder 27 concentric of the axis of the assembly. After the holder is once positioned or centered, eccentrics 20 are preferably welded to prevent disturbance of the adjustment.

Holder 27 is formed with an inwardly extending flange 32 defining an aperture 33 to receive a flange 35 on a ring-like deflector 34, the deflector member being secured thereto by suitable bolt and nut assemblies designated 36 in Figure 2. Deflector 34 is formed with a central aperture to receive feed spout 25, the aperture being shouldered at 37 to receive a gasket 38 surrounding spout 25 and in contact with a shoulder 39 formed on the exterior of the spout 25. By reason of gasket 38 and a shim assembly 41, which is provided between flange 27 and wall 22, leakage of abrasive from the interior of the assembly is prevented. The use of shim assembly 41 enables axial adjustment of the deflector 34 by the use of shims of different thicknesses.

Holder 27 is provided with a removable ring 27' adjacent its inner end which ring 27' fits loosely upon the holder 27 and remains in position during operation of the device, partially by reason of a guard 42, to be later explained in detail. Whereas holder 27 is a relatively expensive item in that it must be machined, ring 27' is made of relatively cheap material, such as pipe. By the use of ring 27', which is easily replaced, the wear that would take place on the holder 27 by reason of the abrasive is taken by the ring 27', and the life of the holder 27 considerably increased.

A guard 42 is provided concentric of the axis of the unit, and is secured to flange 32 of holder 27 by suitable screw and nut assemblies 43.

Deflector 34, as shown more clearly in detail in Figs. 3 to 6, inclusive, in addition to flange 35, is formed with a hollow extending section 44 which supports a blade-like member 45. Blade 45 is continuous about the deflector 34, the ends 46 and 47 thereof being arranged to overlap, as shown in Figures 4 and 6, to define a space or opening 48 having substantially parallel side walls and opening to the interior of the deflector 34 through aperture 48'. Blade 45 is developed in a helical-like formation. As shown in Figure 6, which is a development of the periphery of blade 45, with reference to the top and bottom of Figure 4, the blade is substantially straight throughout section B, section A being developed to extend end section 46 of the blade a considerable distance forward of the remainder.

It will be noted that the outer periphery of blade 45 is designed to be of generally conical shape from its innermost point in abrasive cup 18 to its outermost point, the angle of the cone thus generated approximately conforming to the angle of repose of the abrasive within the cup 18.

To provide a more rigid structure, axially extending flanges 49 are provided between flange 35 and the inside face of blade 45, these flanges being continued about the deflector 34 except at a section adjacent abrasive opening 48. Flanges 49 also function as heat dissipating means and insure the deflector 34 being kept at a relatively low temperature. Substantially radial slots or grooves 51 are formed on the inside face of blade 45 throughout the section B of Figure 6 to insure against so-called "peeling" of the deflector 34 in operation. If the deflector 34 exhibits any tendency to peel by reason of the contact of abrasive therewith, slots 51 will convert that tendency into cracking in a generally radial direction, which will not affect the operation of the deflector 34. If slots 51 were not provided, the peeling of the deflector 34 would continue very rapidly until the proper functioning of the deflector 34 was destroyed, when the deflector 34 would have to be replaced. Slots 51 are also of advantage in that they afford a ready means for determining when the life of a deflector 34 has ended. When the deflector 34 has worn to such an extent that the material defining the outer ends of the slots 51 has disappeared or worn off, the deflector 34 must be replaced.

In the operation of the deflector 34 shown in Figure 1, abrasive is discharged through opening 48 onto the inner ends of radially extending blades 16. It has been found that when large quantities of abrasive are fed to the assembly, as in the order of 15,000 to 25,000 pounds per hour, some of the abrasive hits against the inner ends of blades 16 and rebounds against the outer surface of the deflector 34. When a deflector 34 having a relatively smooth outer surface is employed, this abrasive will bounce back into the path of the inner ends of blades 16 at points remote from discharge opening 48, with the result that such abrasive will be discharged from the wheel at points considerably distant from the intended discharge point.

To overcome this difficulty, a number of ribs 49 are provided with outwardly extending fins 52, preferably five in number, confined to a zone just past discharge opening 48 in the direction of movement of the blades 16, since this is the zone in which the majority of the bouncing or rebounding occurs. Fins 52 are inclined forwardly in the direction of rotation of the rotor disc to provide rear faces 53, the angles of which are conducive to an immediate return of the rebounding abrasive into the path of travel of blades 16. Fins 52 also function with flanges 49 to help dissipate the heat generated in the deflector during operation of the device.

Abrasive receiving cup 18 is shown in detail in Figure 7, and includes an axially extending flange 54 which terminates slightly short of a plane passing through the medial portions of blades 16, as shown in Figure 1. Flange 54 is preferably formed with a plurality of alternately arranged axially extending grooves 55 and ribs 55' to engage and insure the maintenance of a stationary layer of abrasive within the flange at all times during operation, ribs 55' being slightly angularly disposed relative to the axis of the cup. A plurality of ribs 56 are provided in the bottom of the cup 18 for strengthening purposes, and for assisting in accelerating the abrasive fed into the cup to the velocity of the cup. A plurality of smaller intermediate ribs 56' are provided for a like purpose. The upper edges of ribs 55' and ribs 56 are preferably formed with a beveled edge, as shown in Figure 7A, the larger face 57 of the rib thus formed being positioned to face the direction of rotation of the cup.

Cup 18 is also formed with a pair of annular grooves 58 which assist in distribution of the abrasive and prevent it from prematurely discharging over the edge of the cup 18. Flange 54 terminates in an inwardly extending lip 59, which may be termed the discharge edge of the cup 18, since it is over this edge that the abrasive feeds.

Guard 42 is shown in detail in Figures 9 to 11, inclusive, and comprises a base portion 61 having apertures 62 therein to receive securing screw and nut assemblies 43 of Figures 1 and 2. An arcuate shaped portion 63 is secured to base 61, portion 63 stopping short of one end of the base, as shown at 64, and extending beyond the base 61 at the other end for some distance, as shown at 65. Arcuate portion 63 is provided with a flange 66 to define a channel 67 with base 61 which channel operates to catch the stray abrasive particles, prevent their premature discharge into the blades 16, and redirect them into the main discharge stream onto the blades from discharge opening 48.

Blade 16 is shown in Figures 12 to 15, inclusive, and includes a base 68 with a projecting abrasive propelling portion 69, the latter element being formed with a rear face 71 and a front or abrasive propelling face 72.

An upstanding flange 73 is provided at the outer end of abrasive propelling surface 72 to prevent the flow of abrasive over the edge of the blade. Surface 72 is substantially uninterrupted except for a protuberant portion or ridge 74 which begins at the inner end of the blade 16. Ridge 74 diminishes in height with respect to surface 72 toward the outer or discharge end of blade 16 where it merges into surface 72 at a point some distance removed from the discharge end of the blade. Ridge 74 is preferably about 35–60% of the width of surface 72, tapering toward the receiving end of said surface, and is about 50–60% of the length of surface 72. Ridge 74 preferably extends at an angle of about 5° to surface 72.

Ridge 74 has been found to materially increase the life and efficiency of the assembly. Without such a ridge, the inner end of the blade 16 would soon be worn to a condition where it could no longer be used. With such a ridge 74, the abrasive is delivered onto the ridge 74 at an angle which minimizes the impact and wear on the blade 16, and is distributed over the abrasive propelling surface 72 so that it is discharged at the end of the blade 16 in a stream coextensive with surface 72 and of substantially equal density throughout.

Base 68 of blade 16 is formed as one element of a dovetail joint to enable the blade 16 to be secured to rotor disc 13. To reduce the weight of the blade 16 to a minimum, base 68 is recessed in portions, as shown at 77, a series of strenghening ribs 78 being provided between the hollow portions. Recess 77' functions to help secure the blade 16 in its proper position on the disc 13 in a manner to be presently described.

The inner end of blade 16 is preferably beveled or sharpened, as at 79, to provide a minimum surface tending to bat abrasive back at the deflector 34.

Figures 16 to 18, inclusive, illustrate rotor disc 13, which is preferably cast in one piece from wear-resistant Ni-Hard metal with outwardly extending slots 15 to receive the dovetail elements of blade bases 68. While slots 15 have been shown as radial, it is to be understood that they may be formed in a direction to deviate from a radial line, and thus position the blades in non-radial lines. To provide for the locking of each blade 16 on the face of rotor disc 13, one side wall 82 of each slot 15 is cast with a non-circular aperture 83 (preferably square) to receive a similarly shaped locking pin of the type shown in Figures 20 and 21. Correspondingly, the base 68 of each blade 16 is provided with a slot 84 of similar shape. In securing a blade 16 in position on the rotor, the base 68 of the blade 16, with a spring 70 of a width approximately equal to the width of the blade base 68, and of a length to fit in the recess 77' of the blade base 68, is slid into a slot 15 until slot 84 of the blade 16 registers with aperture 83 of the rotor. A pin 17 is then placed in the registered apertures and the blade 16 moved outwardly as far as possible. While the wheel is stationary, the blade 16 is held in position by the force of spring 70, and pin 17 is held by the pressure of a wall of notch 84 thereagainst. During rotation, the blade 16 is held in its outermost position by centrifugal force, and pin 17 is locked in its position by the centrifugal force effective upon the blade. This locking arrangement insures against movement of the blade 16 in any direction in slot 15. Pin 17 is preferably formed with a neck 85 to facilitate its removal by a suitable tool, such as a screw driver.

As surfaces 82 of slots 15 and the engaging surfaces 68' of the blade base 68 are accurately made, the use of spring 70 insures correct contact between these surfaces at all times, whereby the blades 16 remain substantially normal to the face of the rotor disc 13 under all conditions of operation. Spring 70 insures a slight clearance between the blade base 68 and the bottom of rotor slot 15 as shown in Figures 1 and 14.

To prevent any undesirable effect of the flying abrasive on pins 17 and on the apertures in which they are secured, each pin 17 with its corresponding apertures is positioned adjacent the rear faces of the blades 16 whereby it is protected from the abrasive.

To provide additional resistance to disruptive centrifugal force, or the so-called fly wheel bursting effect, rotor disc 13 is formed with an annular flange 60 on its rear face, flange 60 being spaced inwardly of the periphery of the disc 13. Such a location of flange 60 increases the mass of the disc 13 without concentration of the mass at the periphery of the disc 13, where it would be subject to the maximum centrifugal force. A second annular flange 60' is provided within flange 60 to fit against hub 12. The inclined faces of flange 60 with the relatively tight fit of flange 60' prevent any undesirable action of the abrasive on hub 12.

In Figure 1, it will be noted that blades 16 extend a substantial distance beyond the periphery of the rotor disc 13. This arrangement has been found to be particularly beneficial in reducing the wear on the rotor, since the abrasive is discharged at a point considerably removed from the periphery of the rotor disc 13, and the rebound of the abrasive is not as damaging to the periphery of the rotor and disc 13 as in arrangements wherein the rotor disc 13 and the ends of the blades 16 coincide, because the peripheral velocity of the disc 13 is less and the force of impact of the rebounding abrasive thereon is correspondingly less. This arrangement has also been found advantageous in that it enables the elimination of the surrounding guards and protecting flanges hitherto considered necessary.

The method of operation of the apparatus is best illustrated by reference to Figures 1 and 2.

Abrasive, preferably metered, is fed by gravity into spout 25 from which it flows into abrasive receiving cup 18, the abrasive being distributed therein by conical element 21. As abrasive receiving cup 18 rotates at approximately 2250 R. P. M., the speed of shaft 11, the abrasive is centrifugally distributed on the inner surface of the cup 18, and quickly brought up to the speed of rotation of the cup 18 by the ribs and grooves therein. On continued feeding of abrasive, the abrasive layer thus built up will develop a conical inner surface, the angle of which will correspond to the angle of repose of the abrasive under the operating conditions. By reason of annular grooves 58 and flange 59 and the presence of section B of the deflector, escape of the abrasive over the discharge edge 59 will be prevented except at the desired point of discharge.

The direction of rotation of cup 18 is such that section 46 of deflector blade 45 plows into the abrasive layer and directs a certain proportion of the abrasive toward the left, as viewed in Figure 1, and over discharge edge 59 of the cup 18. This abrasive passes through discharge opening 48 which has substantially parallel side walls, and is discharged in the direction generally shown by the arrows C of Figure 2. As above explained, discharge of the abrasive over flange 59 at any other point during operation of the device is prevented by section B of deflector blade 45, which extends about substantially the entire inner periphery of the outer edge of the cup 18 and acts as a closure therefor to prevent the discharge of abrasive at other than the selected point. Section B of blade 45 is preferably positioned a short distance inwardly from the edge of the cup 18, this positioning having been found to increase the efficiency of the assembly.

As shown in Figure 2, deflector blade 45 operates to effect discharge of the abrasive from the rim of the abrasive cup at approximately the 12 o'clock position. The abrasive is thrown in a substantially tangential direction and assumes the form of a slightly fan-shaped continuous ribbon, which ribbon is cut by the inner ends of blades 16 as they successively pass therethrough, each blade cutting off and picking up a section of the ribbon on its ridge 74.

As the direction of rotation of the blades and the direction of the abrasive discharge are the same, there is a minimum impact between the inner ends of the blades and the abrasive, the latter being picked up smoothly and continuously by the blades and discharged from the outer ends in a generally downward direction. The lightness of the impact and consequently the life of the blade is increased by the angle of ridge 74 relative to the blade propelling surface.

If it is desired to change the direction of discharge, nuts 29 are loosened to loosen lugs 28, and holder 27 rotated to change the position of the deflector assembly, the amount of change being indicated by reference to indicator plate 31. In the structure shown, it is possible to adjust the position of discharge as much as 90 degrees.

If it is desired to direct the discharge stream in upward or horizontal directions, the entire assembly, including the housing, and excepting the spout, is suitably rearranged. For instance, to effect discharge in an upward direction, the assembly, excepting the spout, would be inverted.

When the elements of the apparatus have become worn to an extent to require replacement, the deflector and spout assembly as well as the abrasive receiving cup can be readily removed by removing the various loose rivets, bolts, and screws employed therein. Blades 16 can be readily replaced by removing locking pins 17 as previously described, sliding the blades out of the slots in the disc rotor, and reversing the procedure with new blades.

It is to be understood that the invention may be embodied in specific forms other than that illustrated without departing from the principle or essential characteristics thereof. The embodiments shown are therefore to be considered as illustrative and not restrictive, the scope of the invention being defined by the appended claims rather than the foregoing description and drawings. All modifications and changes which come within the meaning and range of equivalency of the claims are therefore intended to be included therein.

I claim:

1. Apparatus for delivering abrasive at an abrading velocity comprising a rotor having a plurality of blades extending outwardly with respect to the axis of rotation of said rotor; means to deliver abrasive near said axis of rotation; and a transfer mechanism interposed between said abrasive delivery means and said blades including a cup rotatable with said rotor with the edge of its open end lying substantially in a plane normal to said axis and between the ends of the inner edges of said blades, means to deliver abrasive from said cup into the path of rotation of said blades including a helical blade disposed about said axis and extending from a point within said cup to a point adjacent said cup edge, and means to prevent a substantial discharge of abrasive from said cup except at said latter point, said means comprising a blade having a portion overlapping said helical blade in a direction to define a discharge opening for said abrasive having substantially parallel side walls.

2. The combination claimed in claim 1 wherein said last-mentioned means is positioned slightly inside of said cup edge.

3. An impeller blade for use in a centrifugal abrading machine including a rotor and means to deliver abrasive adjacent the axis of said rotor, comprising an element having a propelling surface arranged to receive and impart an abrading velocity to the abrasive, said surface being formed with a substantially central protuberant portion having a substantially flat face equal in width to approximately 35% to 60% of the width of said surface.

4. The blade of claim 3 wherein said protuberant portion is tapered in width and is narrowest adjacent the abrasive receiving end of said blade.

5. An impeller blade for use in a centrifugal abrading machine including a rotor and means to deliver abrasive adjacent the axis of said rotor, comprising an element having a propelling surface arranged to receive and impart an abrading velocity to the abrasive, said surface being formed with a substantially central ridge having a substantially flat face, said ridge beginning at the abrasive receiving end of said blade and merging with the remainder of said surface at a point intermediate the discharge and abrasive receiving ends of said blade.

6. The blade of claim 5 wherein said ridge extends from the abrasive receiving end of said rib for a distance approximately equal to 50–60% of the length of said surface.

7. The impeller blade of claim 5 wherein the flat face of said ridge lies in a plane at an angle of approximately 5° to the plane of said propelling surface.

8. A transfer mechanism for use with a centrifugal abrading rotor comprising means to receive and deliver abrasive from said mechanism including a holder, said holder having a shoulder thereon spaced from one end of the holder, and a readily replaceable wear ring of relatively cheap material about said holder to take the wear from abrasive and protect said holder, said shoulder serving to retain the wear ring against displacement in one direction, and a replaceable wear part removably attached to said end of the holder and being of larger diameter than the holder to retain the wear ring against displacement in the opposite direction.

9. In an abrading apparatus, a housing wall having an aperture, abrasive feeding means in said aperture including a deflector, a deflector holder, and means to center said holder in said aperture comprising three cam elements on said wall spaced about said aperture in position to engage and support said holder, and means to lock said cams in position.

10. A deflector for use in a centrifugal abrasive throwing machine comprising a substantially ring-shaped base member, a radially extending flange on the outer periphery of said base member positioned in a plane substantially normal to the axis of said base member, and a second radially extending flange on the outer periphery of said base member having a generally helical formation relative to the axis of said base member.

11. A deflector for use in a centrifugal abrasive throwing machine comprising a substantially ring-shaped base member, a radially extending flange on the outer periphery of said base member positioned in a plane substantially normal to the axis of said base member, and a second radially extending flange on the outer periphery of said base member having a generally helical formation relative to the axis of said base member, said second flange being positioned to intersect said first flange at one end of the latter, the opposite end of said first flange terminating at a point spaced from said point of intersection to provide an open space on the periphery of said base member.

12. The deflector claimed in claim 11 wherein a portion of said first flange adjacent said opposite end is positioned in a plane substantially parallel to the facing portion of said second flange.

13. A deflector for use in a centrifugal abrasive throwing machine comprising a substantially ring-shaped base member, a radially extending flange on the outer periphery of said base member having a portion positioned in a plane substantially normal to the axis of said base member and a portion having a generally helical formation relative to the axis of said base member, the surface of one side of said flange being formed with a plurality of radially extending grooves.

14. A deflector for use in a centrifugal abrasive throwing machine comprising a substantially ring-shaped base member, a radially extending flange on the outer periphery of said base member adjacent one end thereof and having a portion positioned in a plane substantially normal to the axis of said base member and a portion having a generally helical formation relative to the axis of said base member, a second radially extending flange on the outer periphery of said base member adjacent the opposite end thereof and positioned in a plane substantially normal to the axis of said base member, and a plurality of ribs connecting the opposing faces of said flanges.

15. The combination claimed in claim 14 wherein said ribs are secured to said base member.

16. The combination claimed in claim 14 wherein certain of said ribs are extended beyond the peripheries of said flanges to provide a series of substantially tangentially projecting deflectors.

17. A deflector for use in a centrifugal abrasive throwing machine comprising a substantially ring-shaped base member, a radially extending flange on the outer periphery of said base member, a second radially extending flange on the outer periphery of said base member having a generally helical formation relative to the axis of said base member, and means on one of said flanges to indicate when said deflector has worn to an extent to require its replacement.

18. A deflector according to claim 13 in which the side of the flange which is formed with said grooves is that side of the flange which faces away from said generally helical formation.

WALTER L. KEEFER.